Feb. 1, 1927.  
J. D. WALKER  
PLANT PROTECTOR  
Filed Aug. 29, 1925  
1,616,290
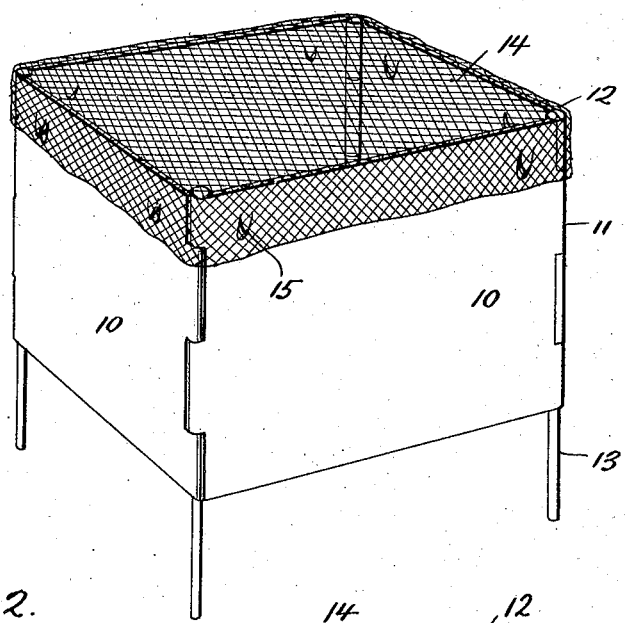
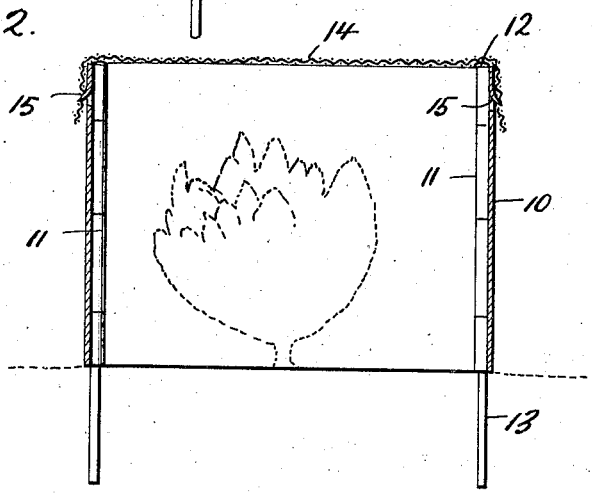
Joseph D. Walker  
INVENTOR  
BY Victor J. Evans  
ATTORNEY
WITNESS: Gerald Hennesy Patented Feb. 1, 1927.

1,616,290

UNITED STATES PATENT OFFICE.

JOSEPH D. WALKER. OF WHITESBURG, TENNESSEE.

PLANT PROTECTOR.

Application filed August 29, 1925. Serial No. 53,390.

This invention relates to improvements in plant protecting devices and has for an object the provision of a plant cover which is adapted to surround and cover a plant or plants in a manner to protect the same from animals and fowls, as well as birds and insects.

Another object of the invention is the provision of a protecting cover for plants which is light in weight, yet strong and durable in construction and may be readily set in position for use, or folded and stored in a relatively small space.

With the above and other objects in view, the invention further includes the following novel features and details of construction, to be hereinafter more fully described, illustrated in the accompanying drawings and pointed out in the appended claim.

In the drawings:—

Figure 1 is a perspective view showing the plant protecting cover in position for use.

Figure 2 is a sectional view of the same.

Referring to the drawings in detail wherein like characters of reference denote corresponding parts, the reference character 10 indicates each of a plurality of panels preferably formed of metal and provided at their opposite ends with eyes 11 for the passage of hinge pins 12, so that the panels will be hingedly connected together and capable of being positioned around a plant or plants. While the panels are shown as providing a rectangular protector, it is of course obvious that the panels may be differently shaped and a greater or less number of panels may be employed.

The hinge pins 12 are preferably positioned within the eyes 11 and extend downward below the lower edges of the panels 10 so as to provide anchor pins or anchor stakes 13. These pins or stakes are adapted to be inserted in the ground so that the protector will be securely held in place. By hinging the panels in the manner stated, the protector may be compactly folded when not in use, or the pins may be removed and the panels stored one upon the other, while if desired, one of the panels may be omitted and a triangular shaped protector provided.

The invention further includes a cover 14 which is made of suitable woven fabric and this cover is removably held in place by means of pointed elements 15 which are struck from the panel and which extend outwardly and downwardly for engagement by the edges of the cover 14.

The invention is susceptible of various changes in its form, proportions and minor details of construction and the right is herein reserved to make such changes as properly fall within the scope of the appended claim.

Having described the invention what is claimed is:—

A plant protector comprising in combination, a plurality of panels, means including hinge pins for hingedly connecting the panels to provide a foldable enclosure, said pins extending downwardly below the lower edges of the panels and providing anchor pins for the enclosure, a cover removably positioned over the enclosure and pointed elements struck from the panels and engaging the edges of the cover.

In testimony whereof I affix my signature.

JOSEPH D. WALKER.